United States Patent
Noe et al.

(10) Patent No.: US 10,143,193 B2
(45) Date of Patent: Dec. 4, 2018

(54) PEST ELECTROCUTION DEVICE WITH INFRARED DETECTOR

(71) Applicants: Robert G. Noe, Ojai, CA (US); Richard J. Tate, Moorpark, CA (US)

(72) Inventors: Robert G. Noe, Ojai, CA (US); Richard J. Tate, Moorpark, CA (US)

(*) Notice: Subject to any disclaimer, the term of this patent is extended or adjusted under 35 U.S.C. 154(b) by 328 days.

(21) Appl. No.: 14/804,216

(22) Filed: Jul. 20, 2015

(65) Prior Publication Data
US 2015/0320029 A1  Nov. 12, 2015

Related U.S. Application Data

(63) Continuation of application No. 12/226,834, filed as application No. PCT/US2007/008008 on Mar. 30, 2007, now abandoned.

(60) Provisional application No. 60/789,356, filed on Apr. 4, 2006.

(51) Int. Cl.
*A01M 23/38* (2006.01)
*G01J 5/00* (2006.01)
*A01M 31/00* (2006.01)

(52) U.S. Cl.
CPC .......... *A01M 23/38* (2013.01); *A01M 31/002* (2013.01); *G01J 5/0025* (2013.01)

(58) Field of Classification Search
CPC ..... A01M 23/38; A01M 31/002; G01J 5/0025
USPC .......................................... 340/3.1
See application file for complete search history.

(56) References Cited

U.S. PATENT DOCUMENTS

| | | |
|---|---|---|
| 1,680,594 A | 8/1828 | Connolly |
| 909,814 A | 1/1909 | Haxton |
| 2,003,513 A | 6/1935 | Myers |
| 2,098,884 A | 11/1937 | Rousseau |
| 2,123,127 A * | 7/1938 | Whipple .............. A01M 1/223 43/112 |
| 2,161,789 A | 6/1939 | Wingfield |
| 2,191,127 A | 2/1940 | Hazel |
| 2,420,723 A | 5/1947 | Ratchford |
| 2,516,264 A * | 7/1950 | Sheehy ............... A01M 1/2016 43/112 |
| 2,595,130 A | 4/1952 | Edwards |
| 3,197,916 A | 8/1965 | Cole, Jr. |
| 3,388,497 A | 6/1968 | Levine |
| 3,468,054 A | 9/1969 | Levine |

(Continued)

FOREIGN PATENT DOCUMENTS

DE  9413200 U1  10/1994
DE  19954142 A1  5/2001
(Continued)

*Primary Examiner* — Steven Lim
*Assistant Examiner* — Kam Ma
(74) *Attorney, Agent, or Firm* — Browdy and Neimark, P.L.L.C.

(57) ABSTRACT

A device for electrocuting pests includes first and second electrodes and an infrared detector. The infrared detector is responsive to infrared radiation emitted by a pest and provides output signals indicating the presence of a pest. A circuit responsive to the output signals and responsive to sensing current flowing between the first and second electrodes, which indicates that a pest is present and in contact with the electrodes, provides high voltage across the first and second electrodes when a selected one of the output signals and the sensing current indicates that a pest is in contact with the electrodes.

20 Claims, 8 Drawing Sheets

(56) References Cited

U.S. PATENT DOCUMENTS

| | | | |
|---|---|---|---|
| 3,792,547 A | | 2/1974 | Day |
| 3,815,278 A | | 6/1974 | Beaton et al. |
| 3,827,176 A | | 8/1974 | Stirewalt |
| 4,048,746 A | | 9/1977 | Dye |
| 4,074,456 A | | 2/1978 | Tedwell |
| 4,205,480 A | | 6/1980 | Gartner |
| 4,497,130 A | | 2/1985 | Fitzgerald |
| 4,780,985 A | | 11/1988 | Coots |
| 5,269,091 A | | 12/1993 | Johnson |
| 5,468,810 A | | 11/1995 | Hayakawa et al. |
| 5,600,143 A | | 2/1997 | Roberts et al. |
| 5,710,515 A | | 1/1998 | Teggatz et al. |
| 5,870,022 A | * | 2/1999 | Kuhnly ............. G08B 29/26 340/511 |
| 5,949,636 A | | 9/1999 | Johnson et al. |
| 6,445,301 B1 | | 9/2002 | Farrell et al. |
| 6,735,899 B1 | * | 5/2004 | Anderson ............ A01M 23/38 43/98 |
| 6,807,767 B1 | | 10/2004 | Schade |
| 7,230,546 B1 | | 6/2007 | Nelson et al. |
| 2005/0044775 A1 | | 3/2005 | Rich et al. |
| 2005/0144830 A1 | | 7/2005 | Rich et al. |
| 2006/0079792 A1 | | 4/2006 | Finburgh et al. |
| 2009/0100743 A1 | * | 4/2009 | Prater ................ A01M 1/04 43/112 |

FOREIGN PATENT DOCUMENTS

| | | |
|---|---|---|
| EP | 2007198 | 9/2010 |
| WO | WO 2004/030450 A2 | 4/2004 |
| WO | WO-2004/098280 A1 | 11/2004 |
| WO | WO-2007/123755 A3 | 10/2008 |

\* cited by examiner

PEST ELECTROCUTION DEVICE WITH INFRARED DETECTOR

CROSS REFERENCE TO RELATED APPLICATIONS

This application is a continuation of U.S. patent application Ser. No. 12/226,834, filed Oct. 29, 2008 as a national stage entry of Patent Cooperation Treaty Application PCT/US2007/008008, filed Mar. 30, 2007, which is hereby incorporated herein by reference, and is related to and claims priority from U.S. Provisional Application No. 60/789,356, filed Apr. 4, 2006, which is hereby incorporated herein by reference.

FIELD OF THE INVENTION

The invention is in the field of devices for exterminating pests, such as but not limited to rodents, by electrocution.

BACKGROUND

Pests, such as rodents, rats, mice, gophers, and other small animals, are a known nuisance and can damage crops and other property, cause injury to people, and spread disease. In North America, the roof rat, Norway rat, and house mouse are the three most common rodent pests. Worldwide, rats and mice spread more than 35 diseases, including hantavirus, leptospirosis, salmonellosis, and plague.

Live traps catch pests but do not kill them. The captured pests must be released, and the released pests may return or pose risks to wildlife. Pests have been known to cause serious harm to bird populations in some areas. In some states, it is actually illegal to release trapped pests into the wild. In other states, the law requires that such pests be killed when trapped, thus negating the purpose of a live trap.

Glue strips, also called glue boards, are sometimes used in areas with children or animals, where a homeowner is particularly worried about using a traditional snap-trap or any kind of poison. Glue traps have several drawbacks. They do not work well in dusty areas or in areas with temperature extremes. The smaller glue boards are not strong enough to catch larger rodents. They are "nonspecific." For example, if a trap is placed in a garage, it might catch a ground-nesting bird instead of a rodent. The biggest problem is that the devices are not very humane. Animals become stuck and struggle, and sometimes suffocate. Moreover, if the rodent hasn't died, the user still has to deal with a live animal. In addition, animals will panic when trapped, will injure themselves trying to escape, and will urinate, exposing homeowners to potential disease.

Poisons are effective, but there are many times when poison cannot be used. Poisons can be inadvertently ingested by pets or children. In addition, pests can transport the poisons, increasing possible exposure of unintended victims. Many exterminators will not use poisons residentially for those reasons. Also, poisoned rodents tend to retreat into a building's walls and crawlspaces, where they die. A dead rodent can be malodorous, can be a breeding ground for maggots, and can be hard to find and clean out. Furthermore, a poisoned rat could leave the house and die, only to be eaten by another animal (or pet) and indirectly poison that animal. Poison is recommended only as a last-ditch effort, when the risks are outweighed by the existing discomfort and health risks of the infestation (such as the smell of rodent excrement and urine).

Snap traps usually kill quickly and humanely, but present the potential for collateral damage to small children, curious pets, and adult fingers. There is also the attendant mess: killed rodents are sometimes bloody or remain alive and are difficult to handle.

Traps that electrocute pests can be very effective, kill quickly and humanely, and do not suffer the drawbacks or present the problems of other rodent control solutions.

SUMMARY

In one embodiment, the invention encompasses a device for electrocuting pests. The device includes first and second electrodes. The device also includes an infrared detector responsive to infrared radiation emitted by a pest, the infrared detector providing output signals indicative of the presence of a pest. The device further includes a circuit that is responsive to the infrared detector output signals and that is responsive to sensing current flowing between the first and second electrodes indicative of the presence of a pest in contact with the electrodes. The circuit provides high voltage across the first and second electrodes when a selected one of the output signals and the sensing current is indicative of a pest being in contact with the first and second electrodes.

In another embodiment, the invention encompasses a device comprising two spaced apart electrodes electrically isolated from one another and arranged to be contacted by parts of the body of a pest to be electrocuted. The device also includes an infrared detector responsive to infrared radiation emitted by a pest and located to detect proximity of a pest to the electrodes. The device further includes a resistance sensor in electrical communication with the electrodes and with the infrared detector for causing a sensing current imperceptible to the pest to flow between the first and second electrodes when contact between the pest and the electrodes forms a circuit path. The sensing current has a magnitude indicative of the presence of a pest being in contact with the first and second electrodes. The infrared detector generates output signals representative of the proximity of the pest to the electrodes. A control circuit in electrical communication with the resistance sensor and the infrared detector activates a high-voltage generator in response to one of the sensing current and the infrared detector output signals. The high-voltage generator is activated by the control circuit to provide high voltage across the electrodes for a predetermined time period, the duration of the predetermined time period and the magnitude of the high voltage being sufficient to electrocute the pest.

In another embodiment, the invention encompasses a method of electrocuting a pest using a device having first and second electrodes, an infrared detector responsive to infrared radiation emitted by a pest and generating output signals indicative of the presence of a pest, and a circuit responsive to said output signals and responsive to a sensing current flowing between the first and second electrodes indicative of the presence of a pest in contact with the electrodes. The method comprises the steps of comparing the infrared detector output signals with an infrared threshold, comparing the sensing current flowing between the first and second electrodes with a current threshold, and causing said circuit to provide high voltage across the first and second electrodes when a selected one of the infrared detector output signals and the sensing current between the electrodes exceeds its respective threshold.

DESCRIPTION OF THE ILLUSTRATED EMBODIMENTS

Figure 1:
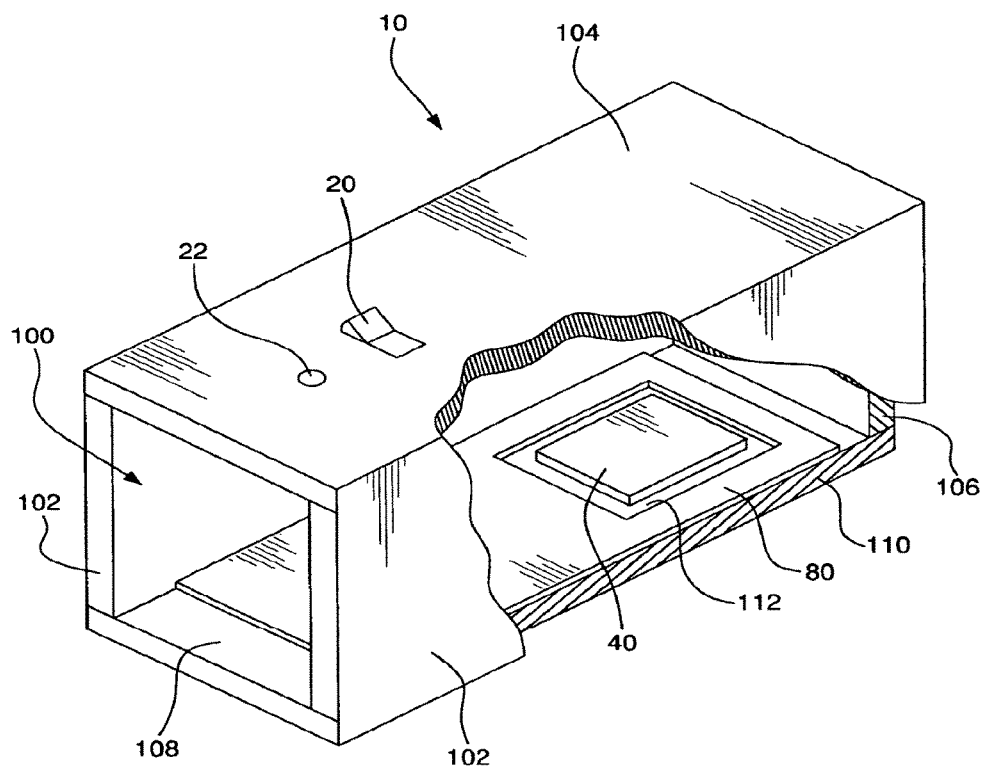
FIG. 1 is a partial cut-away front perspective view of an embodiment of a pest electrocution device of the invention for use in electrocuting pests.
Figure 4:
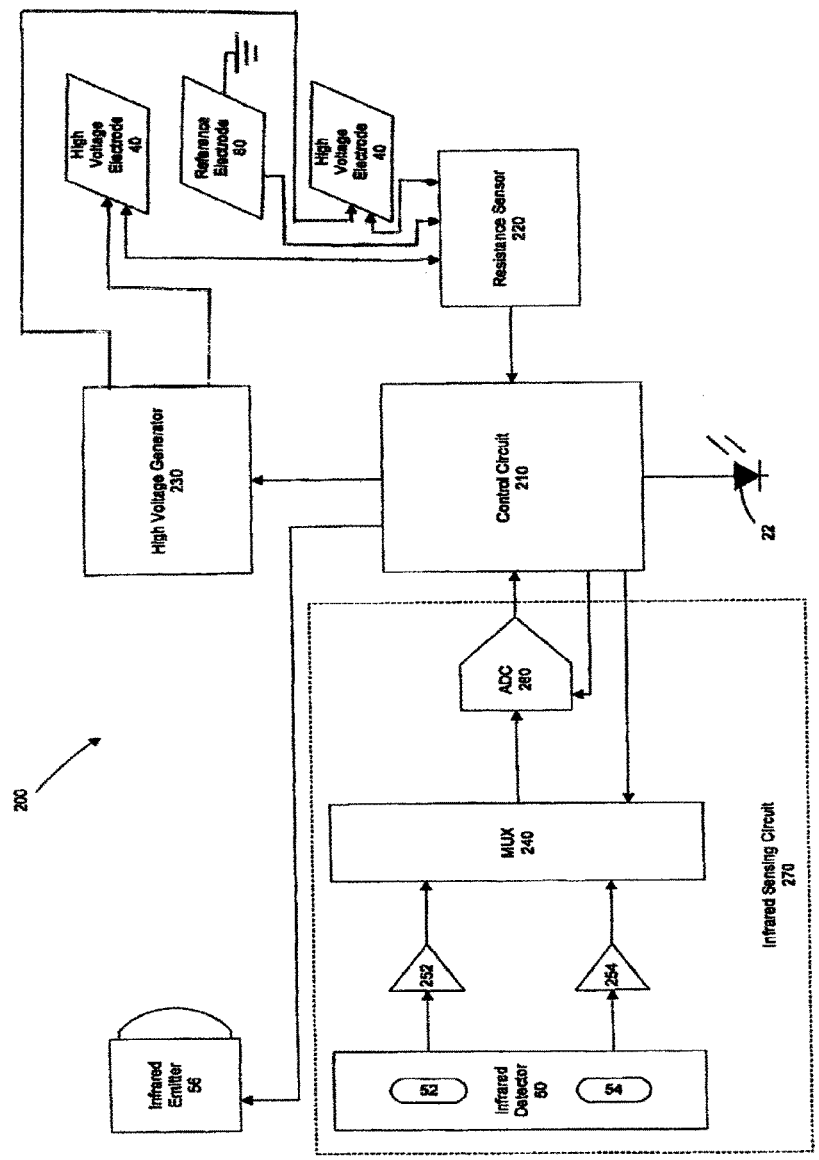
FIG. 4 is a functional schematic of electrical control circuitry corresponding to the embodiments of the pest electrocution device shown in FIGS. 1 through 3B.

Referring now to the drawings, where like numerals indicate like elements, there is shown in FIG. 1 one embodiment of a pest electrocution device 10 of the invention. The device 10 comprises a trap 100 for receiving a pest and electrical control circuitry 200 for controlling the operation of the device 10. An exemplary schematic of the control circuitry 200 is shown in FIG. 4. An on-off switch 20 is provided for turning power on and off to the device 10, and at least one light emitting diode (LED) 22 is provided for indicating the status of the device 10 and for indicating whether a pest has been electrocuted.

Figure 2A:
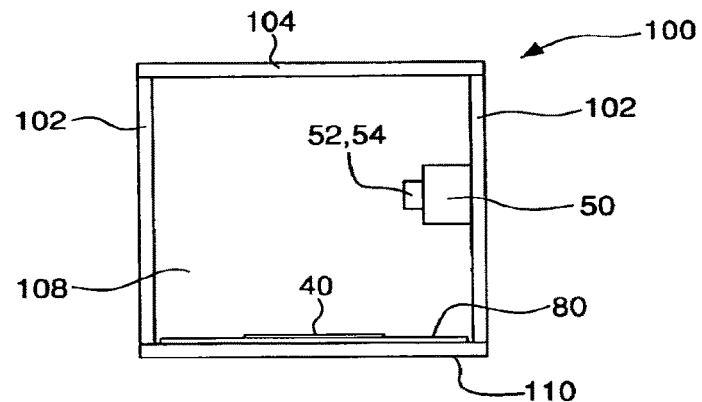
FIG. 2A is front end view of an embodiment of a trap for electrocuting pests, showing a high voltage electrode, a reference electrode, and an infrared detector.
Figure 2B:
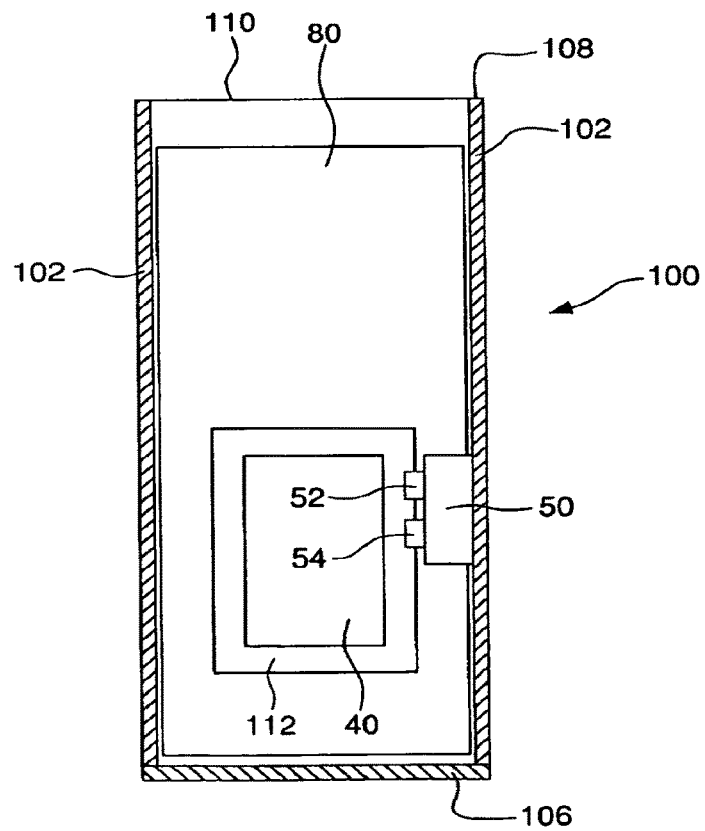
FIG. 2B is a plan view of the trap of FIG. 2A.
Figure 3A:
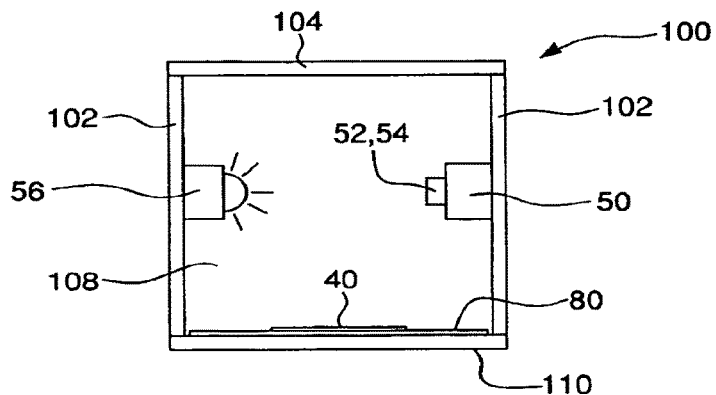
FIG. 3A is a front end view of an embodiment of a trap for electrocuting pests, showing a high voltage electrode, a reference electrode, an infrared detector, and an infrared emitter.
Figure 3B:
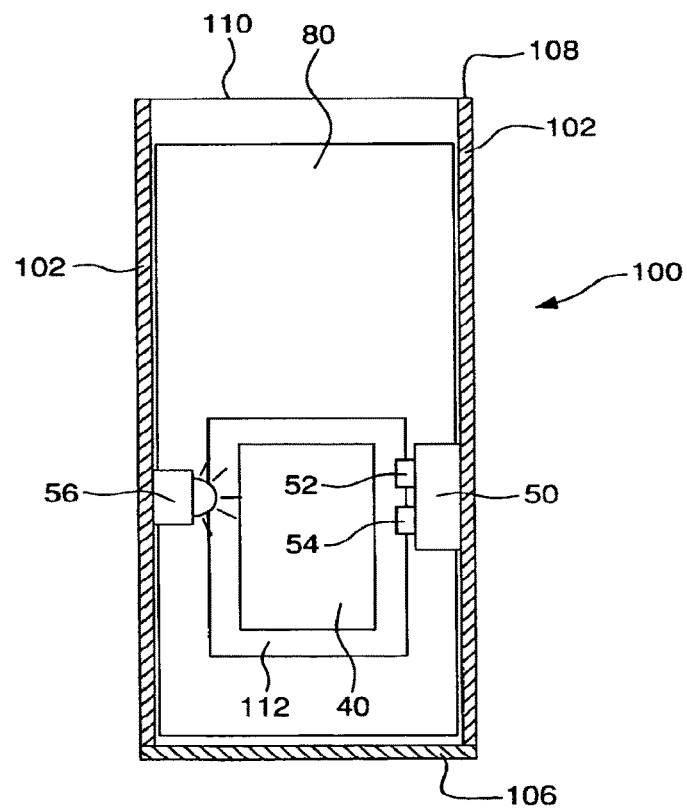
FIG. 3B is a plan view of the trap of FIG. 3A.

The trap 100 has a hollow structure adapted for receiving a pest, and includes opposed sidewalls 102, a top 104, a rear wall 106, an open front end 108 opposite the rear wall 106, and a base 110. The open end 108 provides a pest with a single point of ingress into and egress from the trap 100. A reference electrode 80, a high voltage electrode 40, and an infrared detector 50 are disposed within the trap 100, as illustrated in FIGS. 2A and 2B. The trap 100 may also include an infrared emitter 56 operating in conjunction with the infrared detector 50, as illustrated in FIGS. 3A and 3B.

The device 10 includes one or more mechanisms for detecting the presence of a pest in a position within the trap 100 to be electrocuted. The device 10 comprises a resistance sensor 220 for sensing the presence of a pest in simultaneous contact with both the high voltage electrode 40 and the reference electrode 80. The device 10 further comprises an infrared sensing circuit 270 for sensing infrared radiation emitted by a pest and detected by the infrared detector 50. The device 10 may further comprise the infrared emitter 56 for providing an active infrared source so that blockage or reflection (i.e., backscattering) of the radiation emitted by the infrared emitter 56 may be detected as an indicator that the pest is present and in proper position for electrocution.

In an embodiment shown generally in FIGS. 1 through 3B, the trap 100 preferably has a generally rectangular cross-sectional shape. However, it is readily appreciated that the trap 100 could be any shape, including but not limited to a modified cylindrical shape with a flattened base 110 where the trap 100 contacts the ground. A flattened base 110 enhances stability of the trap 100 and prevents the trap 100 from rolling over, and provides a flat surface for mounting of the high voltage electrode 40 and the reference electrode 80. The trap sidewalls 102, the top 104, and the base 110 are preferably made of a nonconducting material such as ABS plastic or other suitable insulating materials. In particular, the base 110 is made of a material capable of electrically isolating the high voltage electrode 40 from the reference electrode 80. The trap rear wall 106 may be made from a nonconducting material such as ABS plastic or from a conducting material such as galvanized steel, stainless steel, or aluminum. If the rear wall 106 is made from a conducting material, it is preferably electrically interconnected or integral with the reference electrode 80, which is grounded. The reference electrode 80 may be grounded by connection to an electrical ground or common in the device 10 or to an external earth ground.

With reference to FIG. 1, the high voltage electrode 40 is a conductive plate supported by the base 110 of the trap 100. The high voltage electrode 40 is generally flat and is preferably rectangular in shape, although other shapes and configurations of the electrode 40 may be used depending on the geometry of the trap 100 and the type of pest to be eliminated. The high voltage electrode 40 is made of a conducting material, preferably aluminum, galvanized steel, or stainless steel, although other conductive materials may be equally or better suited for a given environment in which the trap 100 may be placed. The electrode 40 is electrically insulated from other components in the trap 100.

The reference electrode 80 is a generally flat conductive plate supported by the base 110 of the trap 100. The reference electrode 80 is disposed so that at least one edge thereof is adjacent to at least one edge of the high voltage electrode 40. Preferably, the reference electrode 80 generally surrounds the high voltage electrode 40. As depicted in the figures, the reference electrode 80 has an opening somewhat larger than the dimensions of the high voltage electrode 40 so that there is a nonconductive gap 112 between any edge of the opening in the reference electrode 80 and any corresponding adjacent edge of the high voltage electrode 40. The high voltage electrode 40 and the reference electrode 80 are electrically isolated from each other, being only mechanically interconnected by the nonconductive base 110.

Although the high voltage electrode 40 is surrounded on all four sides by the reference electrode 80 in the illustrated embodiments, the device 10 can function equivalently if the electrode 40 and the electrode 80 have one, two, or three adjacent edges, as long as it is possible for a pest to have at least one portion of its body in contact with the high voltage electrode 40 and at least another portion of its body in contact with the reference electrode 80. Additionally, the device 10 may include more than one high voltage electrode 40, each electrode 40 being spaced apart from a portion of the reference electrode 80 by an insulating gap 112. For example, two or more high voltage electrodes 40 may be disposed in the trap 100 at the same or different distances from the rear wall 106, and at the same or different distances from one or the other of the sidewalls 102. The electrodes 40 may be of the same or different sizes and shapes.

The high voltage electrode 40 is coupled to a high-voltage output of the control circuitry 200 while the reference electrode 80 is coupled to an electrical ground. The nonconductive gap 112 isolates the high voltage electrode 40 from the reference electrode 80. The gap 112 may be a raised ridge of nonconductive material protruding upwardly from the base 110 between the respective edges of the high voltage electrode 40 and the reference electrode 80, or may merely be a space between the respective edges of the electrodes 40, 80. The gap 112 may comprise an insulating material, including but not limited to rubber, vinyl, or ABS plastic. The gap 112 is preferably small compared with the size of a pest to be electrocuted, but is preferably large enough that one foot of a pest cannot by itself bridge the gap 112 and complete the circuit between the electrodes 40, 80.

Bait may be placed in the trap 100 near the rear wall 106, preferably between the high voltage electrode 40 and the rear wall 106, to attract a pest into the trap 100 and to draw the pest into a position whereby at least one front foot or other body part of the pest is positioned on the conductive high voltage electrode 40 while at least one hind foot or other body part of the pest is positioned on the conductive reference electrode 80. In some cases, one or more additional pieces of bait may be placed closer to the open end 108 to draw the pest incrementally into position in the trap 100.

Referring to the control schematic of FIG. 4, the control circuitry 200 includes a resistance sensor 220 for detecting the presence of a rodent in simultaneous contact with the high voltage electrode 40 and the reference electrode 80. The resistance sensor 220 provides a low voltage to the electrode 40, such that when a pest (or other conductive object) is in contact with both electrodes 40, 80, a small sensing current flows through the pest and is detected by the resistance sensor 220. The sensing current is sufficient to detect the presence of a pest making simultaneous contact with the electrodes 40, 80, but is so small as to be imperceptible to the pest.

The control circuitry 200 further includes a high voltage generator 230 for generating a pulsed high voltage and for providing a pulsed high voltage train to the high voltage electrode 40. The reference electrode 80 is maintained at electrical ground so that a pest straddling the electrodes 40, 80 receives a rapid series of high voltage pulses over a predetermined period of time. As is readily apparent from the schematic and the foregoing description, the resistance sensor 220 and the high voltage generator 230 share the same electrodes 40, 80. Thus, if a rodent is simultaneously making sufficient contact with the high voltage electrode 40 and the reference electrode 80 such that its presence can be sensed by the resistance sensor 220, the rodent is also likely making sufficient contact for purposes of electrocution by the high voltage generator 230. The operation of an exemplary control circuit including a resistance sensor and a high voltage generator is described in detail in U.S. Pat. No. 5,949,636.

Figure 2C:
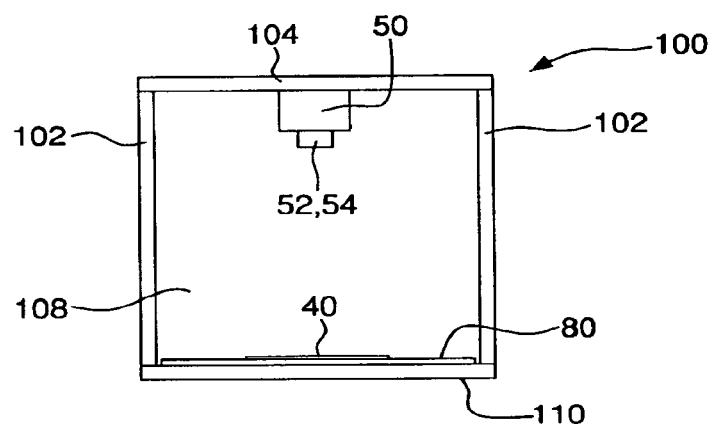
FIG. 2C is a front end view of an embodiment of a trap for electrocuting pests, showing a high voltage electrode, a reference electrode, and an infrared detector.

In a first embodiment, a passive infrared detection system is employed. As shown in FIGS. 2A and 2B, an infrared detector 50 is disposed on an interior sidewall 102 of the trap 100 in relative alignment with the high voltage electrode 40 to detect the presence of a pest in the trap 100 and to detect whether the pest is in a position to be electrocuted. Alternatively, as shown in FIG. 2C, the infrared detector 50 may be disposed on the interior wall of the top 104. The infrared detector 50 may be used to detect the absence or presence of a pest in the trap 100 based on the infrared radiation emitted by the pest itself. The output from the infrared detector 50 is conditioned by an infrared sensing circuit 270 and can be used, alone or in conjunction with the resistance sensor 220, to determine if a rodent is in a position within the trap 100 to be electrocuted.

The infrared detector 50 is designed to detect the thermal signature created by a pest in proximity to the electrodes 40, 80. The infrared detector 50 may be differently configured depending on the size and type of pest to be electrocuted in the trap 100, since different pests may present different infrared signatures. The infrared detector 50 preferably comprises a dual pyroelectric detector having a pair of infrared sensors 52, 54 closely spaced to one another and functioning as a differential pair. For example, the sensors 52, 54 may be spaced at a distance of about one centimeter apart for detection of common rodents such as rats or gophers.

The dual sensor infrared detector 50 provides two voltage signals, one corresponding to each sensor 52, 54, that may be compared to determine the proximity of a pest to the high voltage electrode 40. The two signals are compared electronically such that when the differential exceeds a predetermined threshold level, the high voltage generator 230 may be triggered to electrocute the pest. Dual sensors are preferably utilized to render the infrared detector 50 insensitive to ambient temperature, enabling the device 10 to operate in a wide range of outdoor and indoor temperatures. Because the level of infrared radiation detected by each of the sensors 52, 54 will rise or fall similarly with changes in ambient parameters including but not limited to temperature, vibration, and sunlight exposure, a change in the detected difference between the signals output from each of the sensors 52, 54 is indicative of the presence of an infrared source that is closer to one sensor than another.

Because a moving infrared radiation emitter such as a pest entering the trap 100 will necessarily be closer to one sensor than to the other at some point or points during its movement, a detectable difference will be created between the two signals, indicating the presence of a pest in the trap 100 in proximity to the electrodes 40, 80. For example, consider the arrangement where a first sensor 52 is disposed farther from the high voltage electrode 40 than a second sensor 54, and a differential value is calculated as subtracting the output signal of the second sensor 54 from the output signal of the first sensor 52. As a pest enters the trap 100 and moves past the sensors 52, 54 toward the bait, a differential value will be generated between the respective output signals from the sensors 52, 54. Initially, the first sensor 52 will receive more infrared radiation than the second sensor 54 from the pest, causing the differential value to rise from zero to a positive value. When the pest is directly in front of the infrared detector 50, the differential value will return to approximately zero. When the balance of the pest's infrared signature has passed beyond the infrared detector 50, the differential signal will fall to a negative value (i.e., the second sensor 54 will be receiving more infrared radiation than the first sensor 52). A negative differential value most strongly correlates with a pest being in a position to be electrocuted, although for certain types and sizes of pests, any differential value above a threshold level may be deemed sufficient to trigger the high voltage generator 230 to deliver a high voltage pulse train across the electrodes 40, 80.

In a second embodiment, an active infrared detection system is employed. As shown in FIGS. 3A and 3B, the infrared detector 50 may be used in conjunction with an infrared emitter 56 to detect the absence or presence of a pest in the trap 100 based on the pest interfering with the infrared beam emitted by the emitter 56. The infrared sensing circuit 270 may detect the presence of a pest due to the pest blocking all or part of the infrared beam from reaching the detector 52, or due to the pest scattering or reflecting the beam, thus causing a variation in the infrared radiation received by the sensors 52, 54 of the detector 50. The preferred infrared detector 50 is a dual sensor detector, primarily to allow the detector to function while accommodating for variations in ambient temperature and other environmental factors. As a pest moves into the trap 100, at some point or points the pest will block, backscatter, or reflect more of the infrared beam from one sensor than from the other, causing a differential signal to be detected.

The operation of the control circuitry 200 can be best understood with reference to the control schematic of FIG. 4. The control circuitry 200 is preferably powered by a battery (not shown), enabling the device 10 to be mounted in remote locations where AC electrical power may not be available. Nevertheless, the control circuitry 200 could just as easily be powered via an AC electrical outlet when such power source is conveniently available.

Operation of the device 10 is controlled by a control circuit 210. The control circuit 210 preferably comprises a microprocessor, although equivalent discrete solid state circuits or electrical components may be used. The control circuit 210 receives inputs from the resistance sensor 220 and from the infrared sensing circuit 270. The resistance sensor 220 is designed to detect a small leakage current that flows when a pest is across the two electrodes 40, 80. Good contact of the pest with each electrode 40, 80 must be established before the output from the resistance sensor 220 will be large enough to trigger action by the control circuit 210. When good contact is made, a small leakage current flows from the battery to the high voltage electrode 40, through the pest, and to electrical ground via the reference electrode 80. The action triggered by the control circuit 210 includes causing the high voltage generator 230 to generate and deliver a high voltage pulse train to the high voltage electrode 40 for a predetermined period of time. The high voltage generator 230 is designed to provide levels of voltage and current lethal to the type of pests to be eliminated but not injurious to humans. The predetermined time may be a fixed time or a user-settable time. Alternatively, the predetermined time may be a randomly selected time falling within a range of times sufficient to electrocute a pest without using excessive amounts of electricity. For example, for a large rodent such as a rat or gopher, the predetermined time may be selected, randomly or purposefully, within a range between about 90 seconds and about 150 seconds. Once the predetermined time has elapsed, the high voltage generator 230 is deactivated.

The infrared sensing circuit 270 includes the two sensors 52, 54 of the infrared detector 50, each sensor 52, 54 generating an analog signal in response to sensed infrared radiation. The infrared sensing circuit 270 further includes two signal conditioners 252, 254 corresponding respectively to the sensors 52, 54, a multiplexer 240 (MUX) for transforming the two signals received from the signal conditioners 252, 254 into a single output signal, and an analog-to-digital converter 260 (A/D converter or ADC) for providing a digital signal of the sensed infrared radiation to the control circuit 210. The multiplexer 240 essentially operates as a switch to direct the signal from one infrared sensor or the other through the A/D converter 260 to the control circuit 210. When using a microprocessor or microcontroller as the control circuit 210, the combination of a multiplexer 240 with a single A/D converter 260 is cost effective and simple, because microcontrollers with built-in multi-channel A/D converter peripheral elements are common and inexpensive. Nevertheless, it is recognized that an infrared sensing circuit 270 having dual A/D converters and providing two digital signals to the control circuit 210 may also be used.

The control circuit 210 is capable of sending outputs to the high voltage generator 230, to the status indicating LED 22, and optionally to the infrared emitter 44. When the control circuit 210 determines that a pest is sensed in the trap 100 in a position to be electrocuted, a high voltage timer is triggered and an output signal is sent to enable the high voltage generator 230. The control circuit 210 may determine the presence of a pest based on the signal received from the resistance sensor 220 alone, based on the signal received from the infrared sensing circuit 270 alone, or based on a combination of both signals. The high voltage generator 230 causes a pulsed high voltage to be generated and delivered to the high voltage electrode 40 for a predetermined time set by the duration of the high voltage timer. Various operational modes are described in greater detail below, with reference to FIGS. 5A through 5C.

The high voltage generator 230 is designed to provide levels of voltage and current lethal to the types of pests to be electrocuted, but is designed not to provide voltage and current sufficient to injure humans or common household pets such as dogs and cats. After the predetermined time has elapsed, the control circuit 210 commands the high voltage generator 230 to end the high voltage pulse train. The predetermined timer duration can be adjusted to suit the type of pest, the environment in which the device 10 is operating, and the available power. The timer conserves battery power even if a pest (or any resistive body) continues to make contact between the electrodes 40, 80 after sufficient electricity has been delivered to dispatch the pest by terminating the high voltage pulse train after the predetermined high voltage time has expired.

The pulse frequency is preferably in the audio range. The frequency of the high voltage pulses should be rapid enough to prevent the rodent from recovering between pulses and freeing itself. The amplitude of the pulses should be great enough to produce sufficient current through the pest to electrocute it. Those of ordinary skill will recognize that there are other ways to create lethal voltage and currents for purposes of electrocution that are intended to be within the scope of the present invention. The embodiment disclosed is preferred because it limits the amount of power drawn from the battery used for portable and remote operation. Further, the high voltage and current output circuit has been designed to limit the output current and voltage levels below those which could be dangerous to humans.

The status of the device 10 is indicated by the LED 22. When the device 10 is first powered up, the control circuitry 200 performs a power-on self test, and the LED 22 flashes at first rate or cadence. When an infrared sensor error is detected, the LED flashes at a second "infrared error" cadence. When a resistance error is detected, the LED 22 flashes at a third "resistance error" cadence. When a pest has been electrocuted by the device 10 and remains in the trap 100 and in contact with the electrodes 40, 80, the LED 22 flashes at a fourth "animal trapped" cadence. Other blinking cadences of the LED 22 may be used to indicate various other status or error conditions with respect to the device 10. Additionally, it is readily appreciated that various other visual indicators can be used to indicate the status or error conditions of the device 10. In one example, multiple LEDs can be used, separately or in combination, each LED or combination of LEDs representing a different status or error condition. In another example, a single LED or multiple LEDs having different colors can be used, with each color representing a different status or error condition. In yet another example, a combination of one or more LEDs having different colors and different cadence rates may be used.

In an active infrared embodiment of the trap 100 including an infrared emitter 56, as shown for example in FIGS. 3A and 3B, the control circuit 210 provides power to the infrared emitter 56 whenever the control circuitry 200 is powered.

Figure 5A:
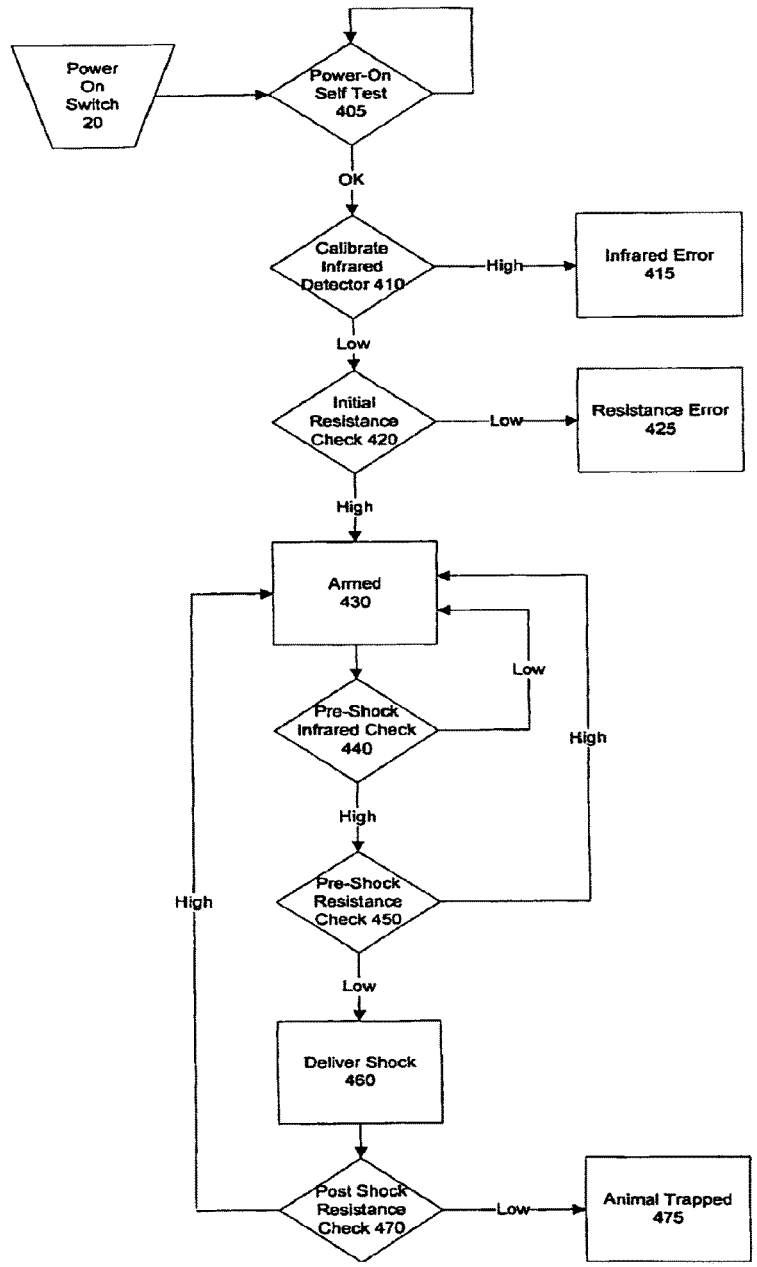
FIG. 5A is a flow chart illustrating a sequence of operation of a device according to the present invention.

Referring to FIG. 5A, a preferred sequence of operation of the control circuitry 200 of the device 10 is depicted. The control circuitry 200 proceeds generally sequentially through a Power-On Self Test step 405, a Calibrate Infrared Detector step 410, and an Initial Resistance Check step 420 to an Armed state 430. In the Armed state 430, the control circuitry 200 performs a Pre-Shock Infrared Check step 440, and when a high infrared differential signal is detected, the control circuitry 200 then performs a Pre-Shock Resistance Check step 450. When a low resistance is detected across the electrodes 40, 80, the control circuitry 200 then proceeds to a Deliver Shock state 460. If either a low infrared differential signal or a high resistance is detected, the control circuitry 200 remains in the Armed state 430 and repeatedly cycles through first the Pre-Shock Infrared Check step 440 and then the Pre-Shock Resistance Check step 450 until both are satisfied. After the Deliver Shock state 460, the control circuitry 200 either returns to the Armed state 430, if no pest has been electrocuted and remains within the trap 100, or proceeds to an Animal Trapped state 475, if an electrocuted pest remains within the trap 100 as determined during a Post-Shock Resistance Check step 470. The operating states and steps performed by the control circuitry 200 are described in more detail below.

When a user enables electrical power to the control circuitry 200 by turning the power switch 20 to the "on" position, the system enters the Power-On Self Test step 405, automatically initiating a test of its circuitry. Once the Power-On Self Test step 405 is satisfied, the system enters the Calibrate Infrared Detector step 410.

In the Calibrate Infrared Detector step 410, the control circuit 210 checks the difference between the signals transmitted by the infrared sensors 52, 54, as conditioned by the infrared sensing circuit 270. The infrared sensing circuit 270 operates as follows. The multiplexer 240 selects the first infrared sensor 52 and transmits the signal received from the signal conditioner 252 to the A/D converter 260, which transmits a first digitized sensor value corresponding to the first sensor 52 to the control circuit 210. The control circuit 210 stores the first sensor value. The multiplexer 240 then selects the second infrared sensor 54 and transmits the signal received from the signal conditioner 254 to the A/D converter 260, which transmits a second digitized sensor value corresponding to the second sensor 54 to the control circuit 210. The control circuit 210 stores the second sensor value and subtracts the first sensor value from the second sensor value to determine an infrared sensor differential value. The control circuit 210 regulates the rate at which the multiplexer 240 samples the infrared sensors 52, 54, and synchronizes the conversions by the A/D converter 260 to match the sampling rate.

If the differential value is above an infrared calibration threshold value, the system enters an Infrared Error state 415, which is indicated by the at least one LED 22. A high infrared differential value may indicate a defective sensor 52, 54, a defective detector 50, an obstruction in front of one or both of the sensors 52, 54, or the presence of an infrared emitting object in the trap 100. If the differential value is below the infrared calibration threshold value, the system proceeds to the Initial Resistance Check step 420. The signals output from the sensors 52, 54 are typically sharp enough that no averaging or other processing is necessary or desirable prior to measuring a differential value. However, if transient effects and signal noise in the infrared sensing circuit 270 are a problem, a "de-bouncing" function may be implemented in the control circuit 210 by taking multiple samples of each infrared sensor signal and requiring that all, or a certain percentage of the samples, be consistent before action is taken. Accordingly, if the de-bounced infrared differential value is high (i.e., above the infrared calibration threshold value), the system enters the Infrared Error state 415, and if the de-bounced infrared differential value is low (i.e., below the infrared calibration threshold value), the systems proceeds to the Initial Resistance Check step 420 and the differential value is stored as a reference infrared differential value.

The reference infrared differential value is stored by the control circuit 210 for use in comparing with infrared differential values measured during operation of the device 10. The reference infrared differential value may be based on a single reading of the initial difference between the dual infrared sensor signals, or may be based on an average of multiple readings taken over a short time interval in order to smooth out transient conditions that may be present due to various factors, including recent handling of the trap 100. A reference differential value based on an average of multiple sensor readings may help to prevent false triggering of the high voltage generator 230. A trigger threshold for infrared detection is established in the control circuit 210 by adding a predefined offset value to the measured reference value, and the infrared trigger threshold value is stored in the control circuit 210. The predefined offset value is determined empirically during design and testing of the device 10, enabling the nulling out of innate differences between the sensors 52, 54 and the associated signal conditioning circuitry in the infrared sensing circuit 270.

In the Initial Resistance Check step 420, the resistance sensor 220 checks the resistance between the high voltage electrode 40 and the reference electrode 80. If a low resistance is detected (i.e., a resistance below a resistance threshold level), indicating the presence of a conductor across the electrodes 40, 80, a Resistance Error state 425 is entered, and a resistance error will be indicated by the at least one LED 22. If a high resistance is detected (i.e., a resistance above a resistance threshold level), the system transitions to the Armed state 430. In order to mitigate transient effects and signal noise in the resistance sensor 220, a de-bouncing function may be implemented in the control circuit 210 by taking multiple samples of the resistance signal and requiring that all, or a certain percentage, of the samples be consistent before action is taken. Accordingly, if the de-bounced resistance level is low (i.e., below the resistance threshold level), the system enters the Resistance Error state 425, and if the de-bounced resistance level is high (i.e., above the resistance threshold level), the system enters the Armed state 430.

In the Armed state 430, the control circuit 210 is poised to trigger the high voltage generator 230 in the event that the infrared sensing circuit 270 indicates the proximity of a pest to the electrodes 40, 80 and/or the resistance sensor 220 indicates the presence of a pest in contact with the electrodes 40, 80, such that a high voltage shock can be effectively delivered to the pest.

In the Pre-Shock Infrared Check step 440, the control circuit 210 checks the difference between the signals transmitted by the infrared sensors 52, 54, as conditioned by the infrared sensing circuit 270. The multiplexer 240 selects the first infrared sensor 52 and transmits the signal received from the signal conditioner 252 to the A/D converter 260, which transmits a first digitized sensor value corresponding to the first sensor 52 to the control circuit 210. The control circuit 210 stores the first sensor value. The multiplexer 240 then selects the second infrared sensor 54 and transmits the signal received from the signal conditioner 254 to the A/D converter 260, which transmits a second digitized sensor value corresponding to the second sensor 54 to the control circuit 210. The control circuit 210 stores the second sensor value and subtracts the first sensor value from the second sensor value to determine an infrared sensor differential value, which is compared to the infrared trigger threshold value stored in the control circuit 210. The infrared trigger threshold value is the sum of the reference infrared differential value and a predefined offset value. If the sensed infrared differential value is above the trigger threshold value, the system remains in the Armed state 430 and proceeds to the Pre-Shock Resistance Check step 450. If the sensed infrared differential value is below the trigger threshold value, the system remains in the Armed state 430 and the Pre-Shock Infrared Check step 440 is repeated. As before, in order to mitigate transient effects and signal noise in infrared sensing circuit 270, a de-bouncing function may be implemented in the control circuit 210 by taking multiple samples of each infrared sensor signal and requiring that all, or a certain percentage, of the samples be consistent before action is taken.

The Pre-Shock Resistance Check step 450 determines whether a pest is sufficiently in contact with the electrodes 40, 80 to be effectively electrocuted. Because a pest, including but not limited to a rodent, is able to conduct electricity with fairly low resistance, the resistance detected across the electrodes 40, 80 by the resistance sensor 220 drops significantly when a pest has one or more feet or other body part in contact with the high voltage electrode 40 and simultaneously has one or more feet or other body part in contact with the reference electrode 80. As in the Initial Resistance Check step 420, the resistance signal is de-bounced to avoid false triggering of the high voltage generator 230. Once the resistance sensor 220 indicates a resistance below a resistance trigger threshold level, the system enters the Deliver Shock state 460. As long as the detected resistance remains above the resistance trigger threshold level, the system remains in the Armed state 430 and the Pre-Shock Resistance Check step 450 is repeated. Alternatively, repeated testing of the resistance across the electrodes 40, 80 may be contingent upon continued satisfaction of the infrared trigger threshold, such that if the infrared differential value does not remain above the infrared trigger threshold value, the system will revert to the Pre-Shock Infrared Check step 440.

In the Deliver Shock state 460, the control circuit 210 triggers the high voltage timer and commands the high voltage generator 230 to deliver a high voltage pulse train to the high voltage electrode 40 for the predetermined time period controlled by the high voltage timer. For typical rodents such as rats and gophers, a predetermined time of approximately two minutes has been shown to be effective, but this time can be adjusted depending on the size and type of pests to be electrocuted, as well as on other factors.

Upon expiration of the predetermined time period, the control circuit 210 commands the high voltage generator 230 to end the high voltage pulse train, and the system proceeds to the Post-Shock Resistance Check step 470. The Post-Shock Resistance Check step 470 determines whether the resistance across the electrodes 40, 80 is above a resistance threshold level, indicating that the pest may have escaped or at least has exited the trap 100, or below a resistance threshold level, indicating that a dead pest remains in the trap 100 and continues to make contact with both electrodes 40, 80. As in the previous resistance check steps, the resistance signal may be de-bounced to avoid spurious or false readings. If the resistance is high (i.e., above the threshold level), the system returns to the Armed state 430 to await triggering by the presence of another pest. If the resistance is low (i.e., below the threshold level), the system proceeds to the Animal Trapped state 475, whereby the pest must be removed and power to the control circuitry 200 reset before the device 10 is ready to electrocute another pest. In the Animal Trapped state 475, the at least one LED 22 will indicate that an animal has been trapped by blinking at a specified rate, by displaying a specified color, by illuminating in a specified combination, or by other distinct visual indication.

In accordance with the above-described embodiment, the control circuit 210 in the Armed state 430 is poised to trigger the high voltage generator 230 based upon sequential signals from the infrared sensing circuit 270 and from the resistance sensor 220. Stated otherwise, if the infrared sensing circuit 270 indicates that a pest is in proximity to the electrodes 40, 80, the control circuit 210 then tests whether the resistance sensor 220 indicates the presence of a pest in simultaneous contact with the conductive electrodes 40, 80. Requiring both the infrared detector and resistance sensor inputs to be satisfied in sequence guards against false and unnecessary triggering of the high voltage generator 230 that might otherwise occur if the generation and delivery of high voltage was based on only one or the other sensor input. Avoiding false triggering of the high voltage generator 230 conserves battery power.

Figure 5B:
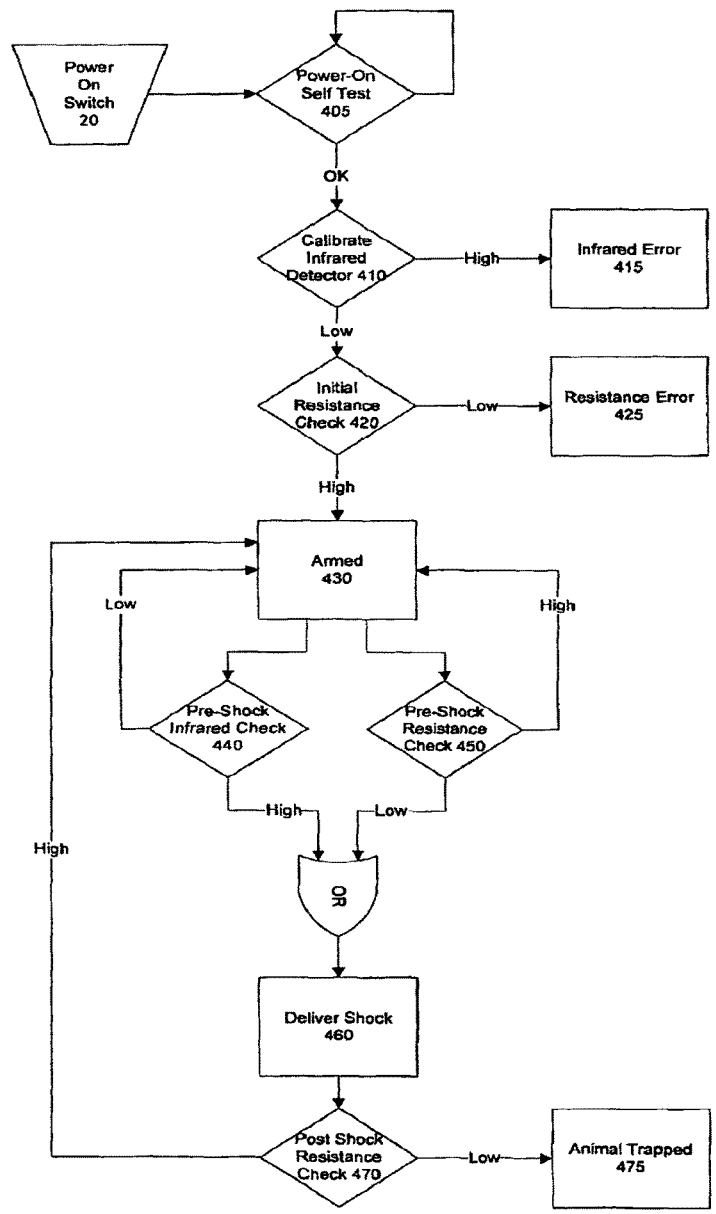
FIG. 5B is a flow chart illustrating a sequence of operation of a device according to the present invention.

Nevertheless, in some circumstances, it may be advantageous for the device 10 to provide a high voltage pulse train based upon either one of a high sensed infrared differential value or a low sensed resistance between the electrodes 40, 80. Accordingly, as illustrated in FIG. 5B, an alternate embodiment of the device 10 causes the system to proceed from the Armed state 430 to the Deliver Shock state 460 upon satisfaction of either the Pre-Shock Infrared Check step 440 or the Pre-Shock Resistance Check step 450.

Figure 5C:
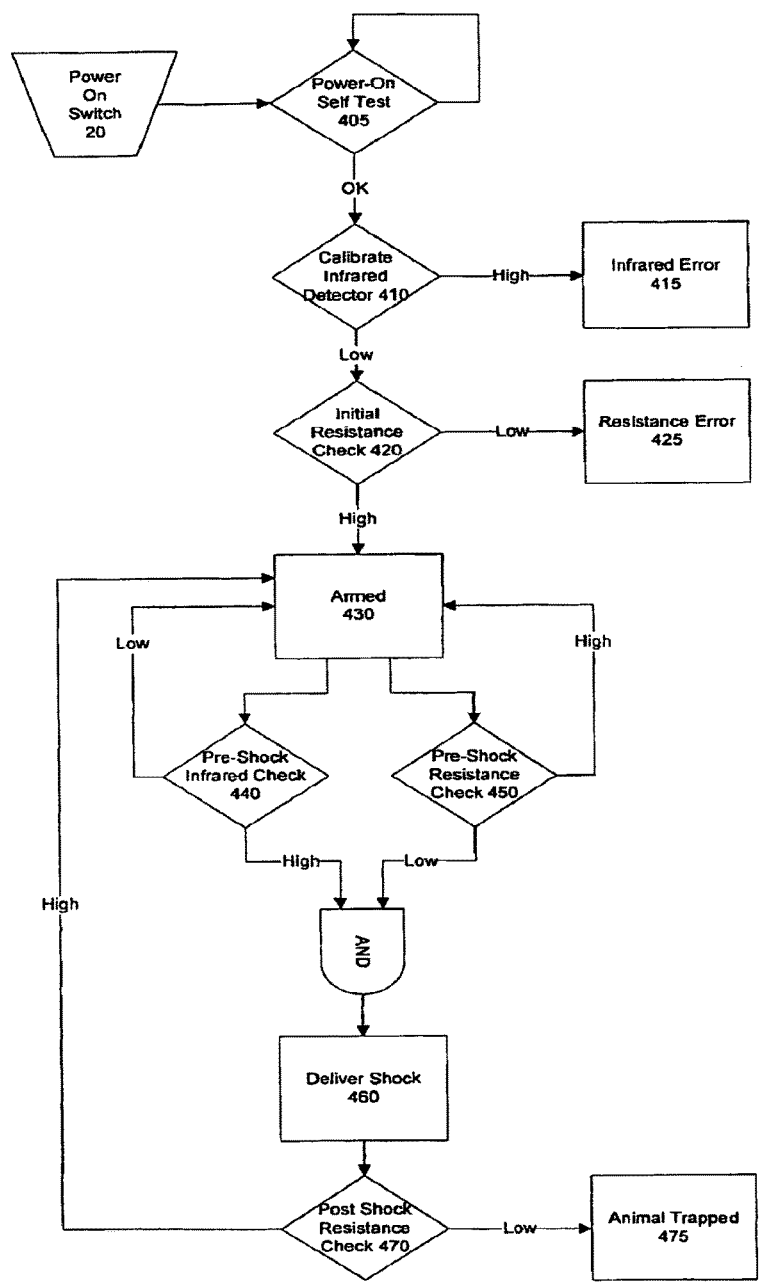
FIG. 5C is a flow chart illustrating a sequence of operation of a device according to the present invention.

In other circumstances, it may be advantageous for the device 10 to provide a high voltage pulse train based upon concurrent occurrence of both a high sensed infrared differential value and a low sensed resistance between the electrodes 40, 80. Accordingly, as illustrated in FIG. 5C, another alternate embodiment of the device 10 causes the system to proceed from the Armed state 430 to the Deliver Shock state 460 only upon simultaneous satisfaction of the Pre-Shock Infrared Check step 440 and the Pre-Shock Resistance Check step 450.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A device for electrocuting pests, comprising
   (a) at least one reference electrode and at least one non-reference electrode, including a plurality of non-reference electrode regions, each of the non-reference electrode regions being spaced apart from a portion of the reference electrode exclusively by an insulating gap defining a distance between each non-reference electrode region and the portion of the reference electrode to ensure that one foot of a pest to be electrocuted cannot by itself bridge the distance between the non-reference electrode region and the portion of the reference electrode and complete a circuit between the non-reference electrode region and the portion of the reference electrode, the at least one reference electrode and the at least one non-reference electrode being electrically isolated from one another and arranged to be both contacted by parts of a body of a pest to be electrocuted, (b) an infrared detector responsive to infrared radiation emitted by a pest, said infrared detector providing output signals indicative of the presence of a pest, and (c) a circuit responsive to said output signals, said circuit providing high voltage between the at least one reference electrode and the at least one non-reference electrode when the output signals are indicative of the presence of a pest.

2. The device of claim 1, wherein the infrared detector comprises two spaced-apart infrared sensors, each of which generates an electrical signal representative of infrared radiation incident thereon.

3. The device of claim 2, further comprising a multiplexer for alternately transmitting to said circuit the electrical signal from a selected one of the two sensors and wherein said circuit measures the difference between the two sensor signals.

4. The device of claim 1, wherein the circuit includes a microprocessor.

5. The device of claim 1 wherein the at least one reference electrode is coupled to an electrical ground and the at least one non-reference electrode is coupled to a high-voltage output of the circuit.

6. The device of claim 1 wherein the circuit is responsive to a resistance sensor output indicative of the presence of a pest in contact with the reference and non-reference electrodes, and wherein the circuit provides high voltage between the reference and non-reference electrodes only when the resistance sensor output is indicative of the presence of a pest in contact with the reference and non-reference electrodes.

7. The device of claim 1 wherein the insulating gap comprises an insulating material.

8. The device of claim 7 wherein the insulating material comprises rubber, vinyl, or ABS plastic.

9. The device of claim 1 wherein the insulating gap comprises a raised ridge of nonconductive material protruding upwardly between respective edges of the non-reference electrode regions and the portion of the reference electrode.

10. A device for electrocuting pests, comprising (a) at least one reference electrode and at least one non-reference electrode, including a plurality of non-reference electrode regions, each of the non-reference electrode regions being spaced apart from a portion of the reference electrode exclusively by an insulating gap defining a distance between each non-reference electrode region and the portion of the reference electrode to ensure that one foot of a pest to be electrocuted cannot by itself bridge the distance between the non-reference electrode region and the portion of the reference electrode and complete a circuit between the non-reference electrode region and the portion of the reference electrode, the at least one reference electrode and the at least one non-reference electrode being electrically isolated from one another and arranged to be both contacted by parts of a body of a pest to be electrocuted, (b) an infrared detector responsive to infrared radiation emitted by a pest and located to detect proximity of a pest to the reference and non-reference electrodes, said infrared detector generating output signals representative of the proximity of the pest to the reference and non-reference electrodes, (c) a control circuit in electrical communication with the infrared detector for activating a high-voltage generator in response to the infrared detector output signals, (d) said high-voltage generator being activated by the control circuit to provide high voltage between the at least one reference electrode and the at least one non-reference electrode for a predetermined time period, the duration of the predetermined time period and the magnitude of the high voltage being sufficient to electrocute the pest.

11. The device of claim 10, wherein the control circuit applies a low voltage to the reference and non-reference electrodes after the predetermined time period has elapsed to determine whether the body of a pest is in contact with the reference and non-reference electrodes.

12. The device of claim 11, further comprising an indicator for providing a visual indication to a user if the body of the pest is in contact with the reference and non-reference electrodes after the predetermined time period has elapsed.

13. The device of claim 10 wherein the control circuit is responsive to a resistance sensor output indicative of the presence of a pest in contact with the reference and non-reference electrodes, and wherein the control circuit activates the high-voltage generator only when the resistance sensor output is indicative of the presence of a pest in contact with the reference and non-reference electrodes.

14. A method of electrocuting a pest comprising the steps of:

(a) providing a device having at least one reference electrode and at least one non-reference electrode, including a plurality of non-reference electrode regions, each of the non-reference electrode regions being spaced apart from a portion of the reference electrode exclusively by an insulating gap defining a distance between each non-reference electrode region and the portion of the reference electrode to ensure that one foot of a pest to be electrocuted cannot by itself bridge the distance between the non-reference electrode region and the portion of the reference electrode and complete a circuit between the non-reference electrode region and the portion of the reference electrode, the at least one reference electrode and the at least one non-reference electrode being electrically isolated from one another and arranged to be both contacted by parts of a body of a pest to be electrocuted, and an infrared detector responsive to infrared radiation emitted by the pest and generating output signals indicative of the presence of the pest, and a circuit responsive to said output signals indicative of the presence of the pest, (b) comparing the infrared detector output signals with an infrared threshold, (c) causing said circuit to provide high voltage between the at least one reference electrode and the at least one non-reference electrode when the infrared detector output signals exceed the infrared threshold.

15. The method of claim 14, further comprising the step of:

(d) causing said circuit to provide low voltage between the at least one reference electrode and the at least one non-reference electrode after a predetermined time period has elapsed to determine whether the body of the pest is in contact with the reference and non-reference electrodes.

16. The method of claim 15, further comprising the step of repeating steps (b) through (d) if the body of the pest is not determined to be in contact with the reference and non-reference electrodes.

17. The method of claim 15, further comprising the step of providing a visual indication to a user if the body of the pest is determined to be in contact with the reference and non-reference electrodes.

18. The method of claim 14, the step (a) further comprising calibrating the infrared detector in the absence of a pest to verify that the infrared detector output signals are below a threshold.

19. The method of claim 14, wherein the infrared detector comprises two spaced-apart infrared sensors, each of which generates an electrical signal representative of infrared radiation incident thereon, and wherein said circuit measures the difference between the two sensor signals.

20. The method of claim 14 wherein the circuit is responsive to a resistance sensor output indicative of the presence of the pest in contact with the reference and non-reference electrodes, and wherein the method further comprises comparing the resistance sensor output with a threshold, and wherein the circuit provides high voltage between the reference and non-reference electrodes only when the resistance sensor output exceeds the threshold.

* * * * *